Aug. 17, 1926.
W. A. DOREY
1,596,006
LUMINAIRE
Filed Oct. 31, 1923  11 Sheets-Sheet 1
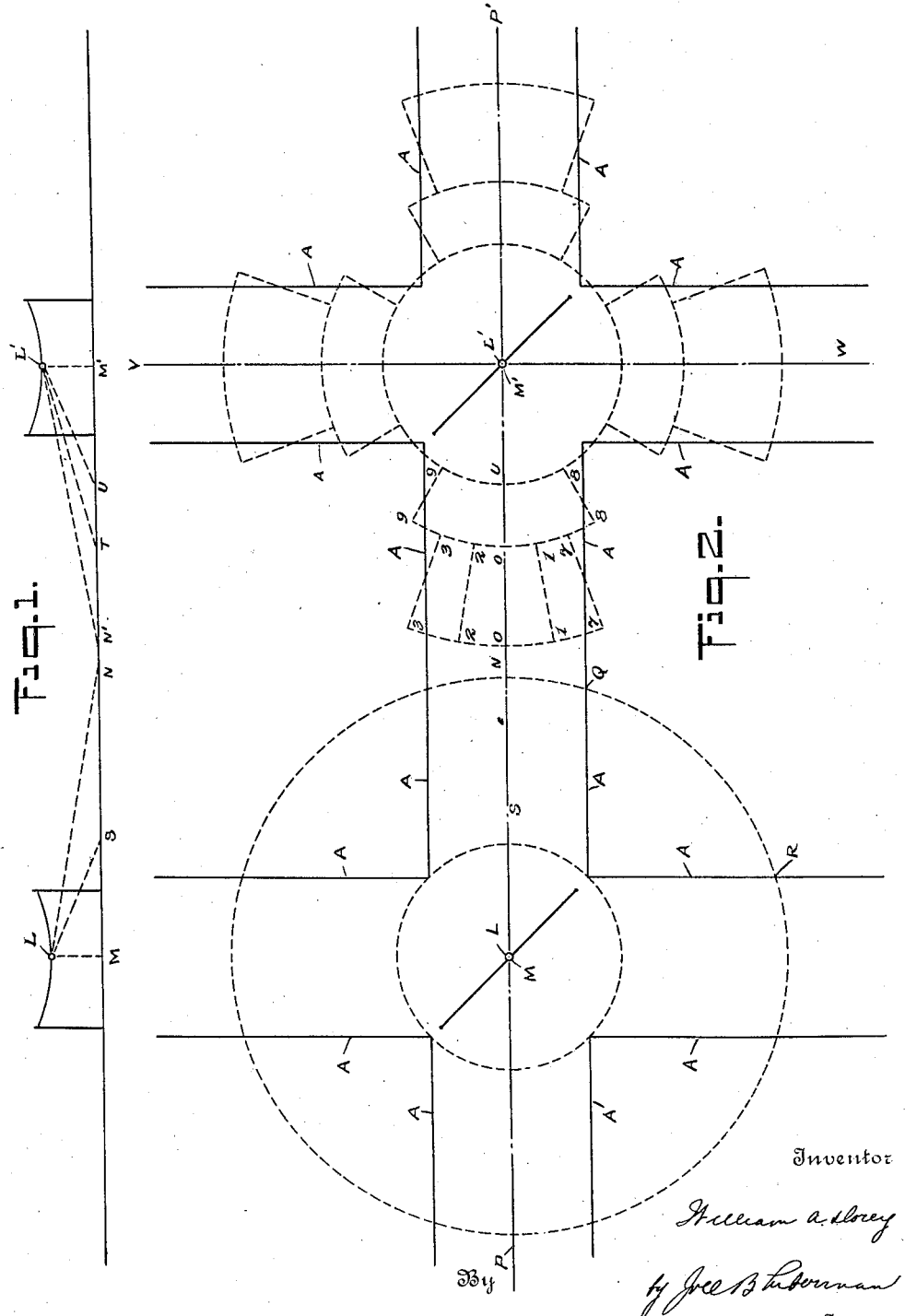

Aug. 17, 1926.  
W. A. DOREY  
LUMINAIRE  
Filed Oct. 31, 1923  
1,596,006  
11 Sheets-Sheet 2

Aug. 17, 1926.

W. A. DOREY 1,596,006

LUMINAIRE

Filed Oct. 31, 1923    11 Sheets-Sheet 6

Aug. 17, 1926. 1,596,006
W. A. DOREY
LUMINAIRE
Filed Oct. 31, 1923 11 Sheets-Sheet 10

Inventor
William A. Dorey
By Joel B. Liberman
his Attorney

Aug. 17, 1926.

W. A. DOREY 1,596,006

LUMINAIRE

Filed Oct. 31, 1923   11 Sheets-Sheet 11

INVENTOR
William A. Dorey
BY
Jacob Liberman
his ATTORNEY

Patented Aug. 17, 1926.

1,596,006

UNITED STATES PATENT OFFICE.

WILLIAM A. DOREY, OF NEWARK, OHIO, ASSIGNOR TO HOLOPHANE GLASS COMPANY, OF NEW YORK, N. Y., A CORPORATION OF NEW JERSEY.

LUMINAIRE.

Application filed October 31, 1923. Serial No. 671,919.

The object of this invention is the construction of luminaires which if properly installed will give a strong even illumination over a restricted street or road area at a comparatively low cost, due to lateral concentration of light. It may also be used to furnish signal beams throughout similar street or road areas. This is accomplished by means of one or more envelopes providing an outer refracting surface and an inner surface consisting of a series of adjacent segments serving to refract incident light rays laterally in an intensive beam and to widen the combined effective aperture. In special cases when the luminaires are easily accessible for cleaning and it is important to limit the size and cost as much as possible a single refractor is used having on its interior surface a series of adjacent segments serving to refract incident light rays laterally in an intensive beam and to widen the combined effective aperture.

Fig. 1 is a diagram in elevation of a typical street light condition.

Fig. 2 is a plan view of such typical condition.

Figure 6:
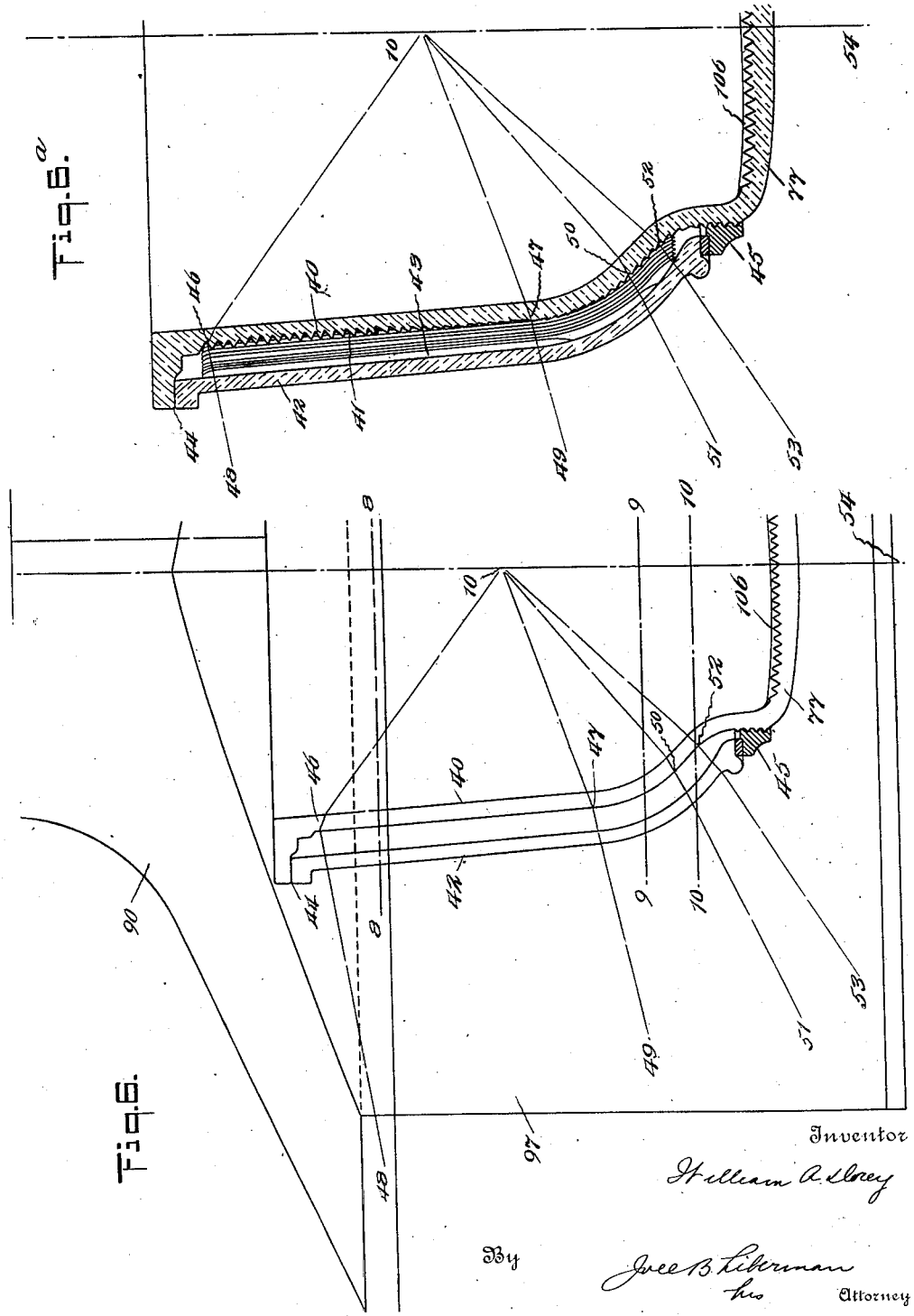
Figure 7:
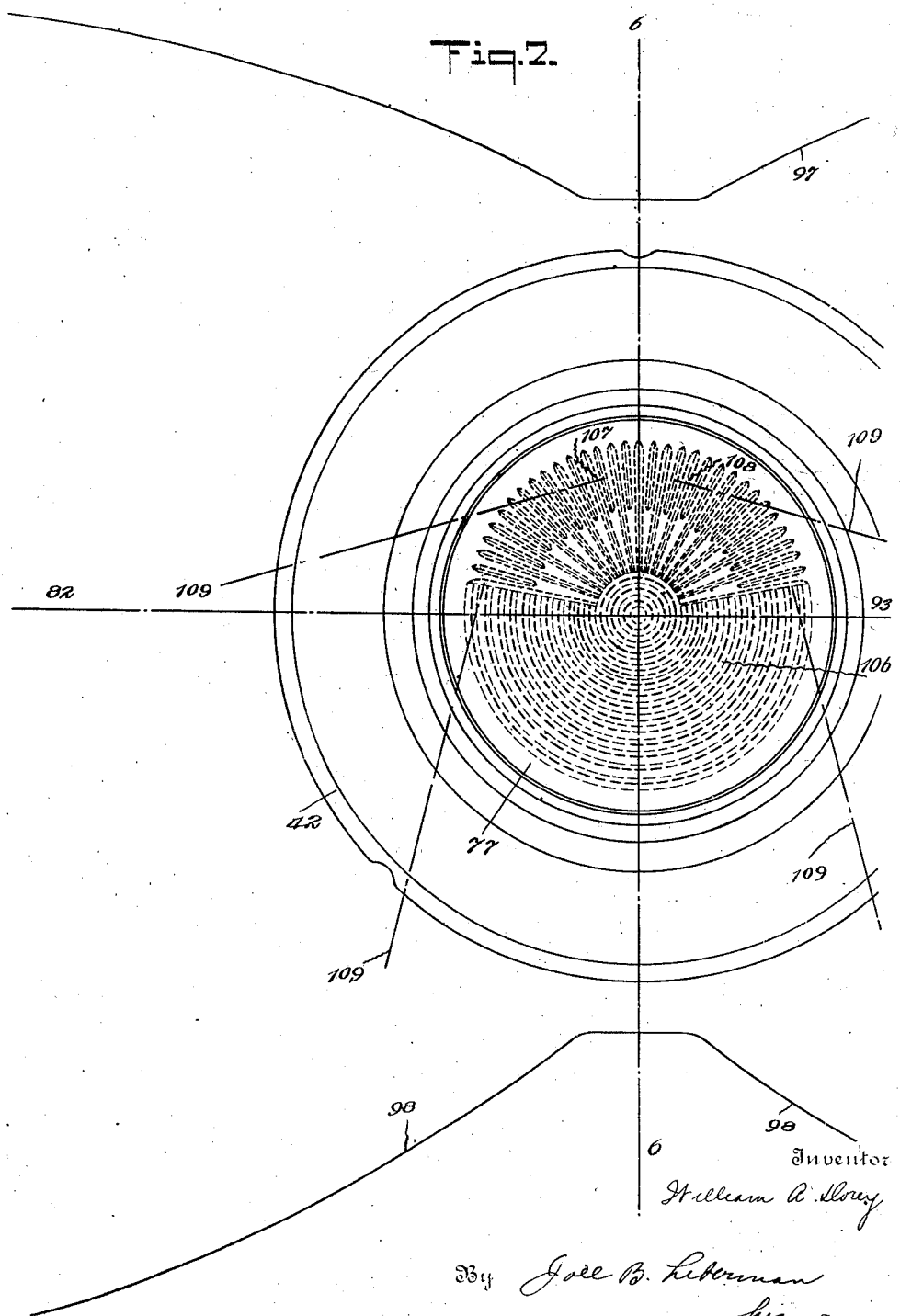

Figs. 6 and 6ᵃ are vertical cross sections and Fig. 7 is a plan view of a different form of luminaire for use in lighting highways.

Figure 8:
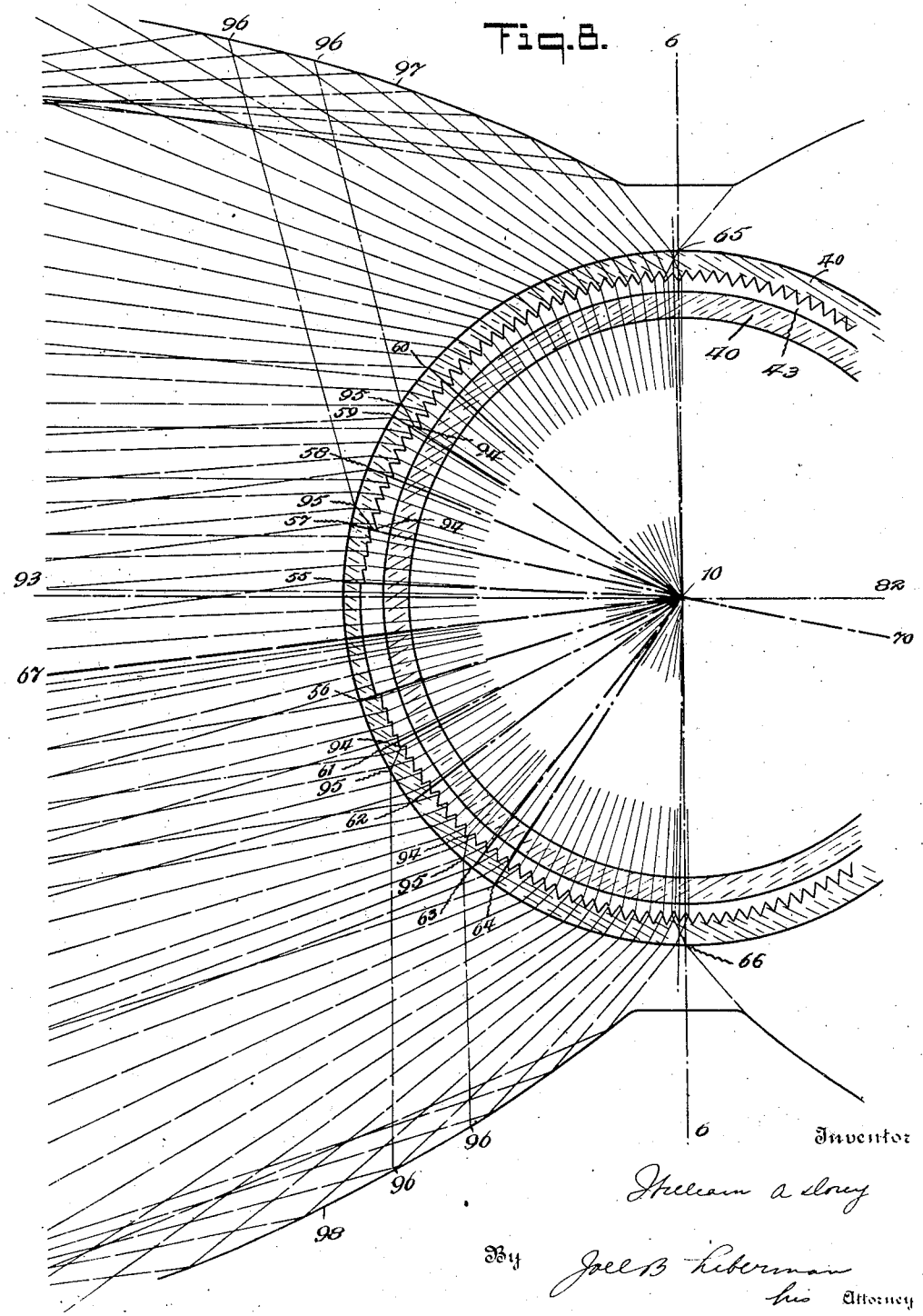
Figure 9:
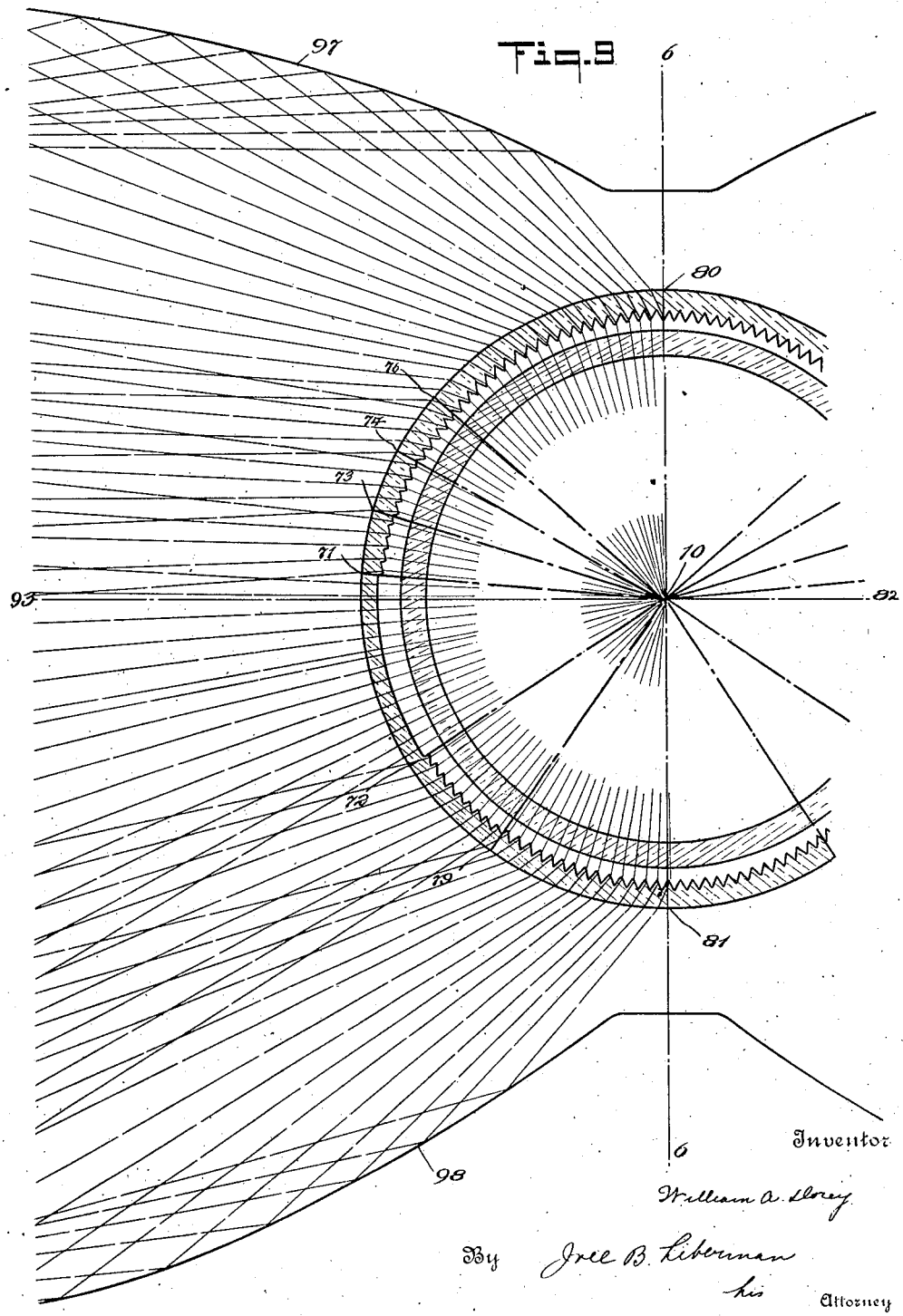
Figure 10:
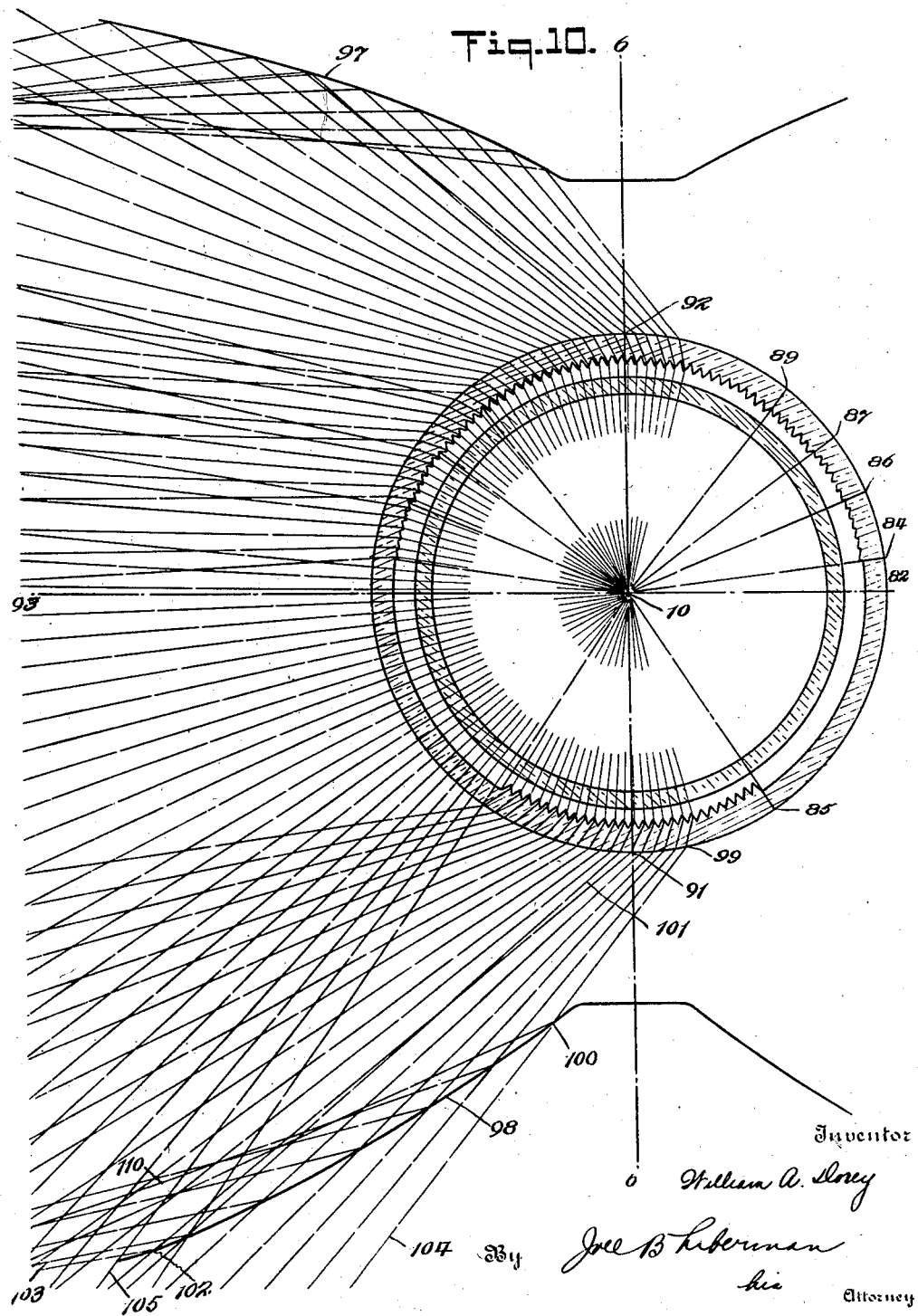

Figs. 8, 9 and 10 are cross sections in Fig. 6 on the lines 8—8; 9—9; 10—10, respectively.

Figure 11:
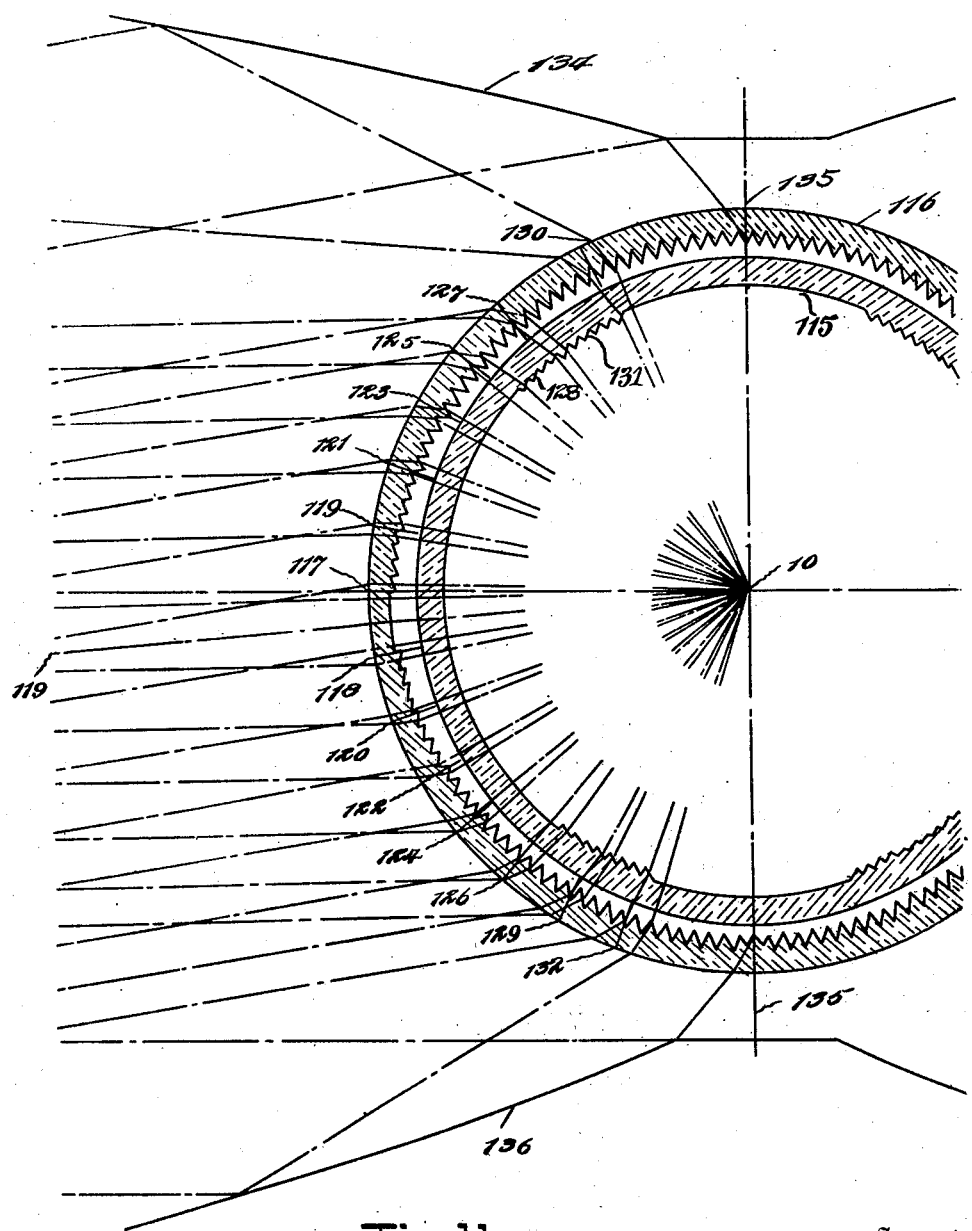

Fig. 11 is a cross section of another form of luminaire for use in lighting highways.

Figure 12:
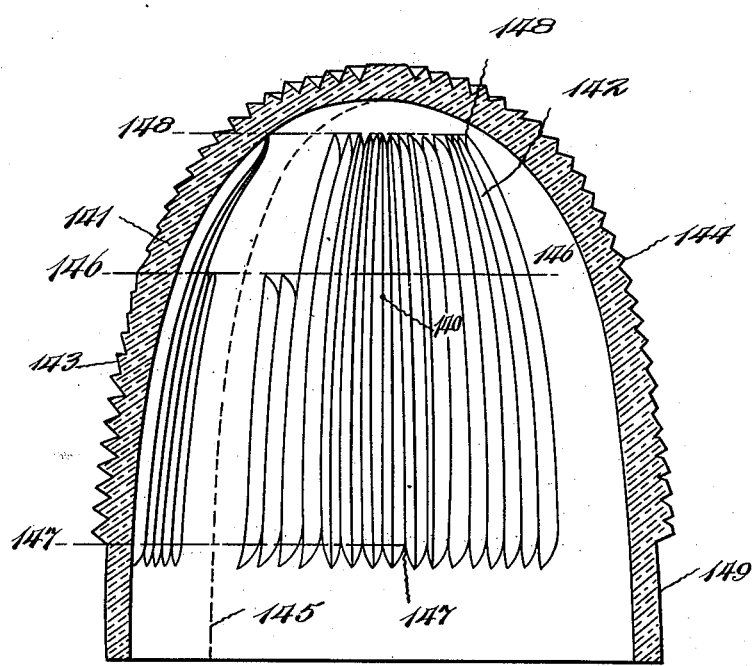

Fig. 12 is a vertical cross section at 45° with the beam axis of a form of luminaire used as a stop signal on the rear end of automobiles.

The lighting of outdoor spaces differs from the lighting of interiors in that for purposes of economy the sources are usually spaced much further apart, the illumination is helped very little by reflection from other objects and on account of the relatively wide spacing the form of the distribution of the direct light from the source is of much greater importance. The use of refracting glassware in this service has been found of especial advantage because by such means the divergent light rays can be concentrated over a wide area of ground surface in such relative intensities as to give substantially uniform illumination at all points.

A typical case of outdoor illumination is that in which blocks approximately 300 feet long are lit by sources suspended over the center of street intersections. In such a case the sources should be mounted at least 25 feet above the street surface.

Figs. 1 and 2 shown, in diagram, elevation and plan of such a typical installation, L and L' being two adjacent light sources and AAA being the limits of the area which it is most essential to illuminate. To secure absolutely uniform illumination of street surface along the line SN, the intensity from the source L in the direction LN would have to be ten times the intensity along the lines LS. In order that a satisfactory approach to uniformity be secured the intensity in direction LN should be at least two times the intensity along the line LS. Moreover, when the total flux of light available for illuminating the street surfaces can be increased by the use of light sources of increased intensity or by improvements in the design of the refractors a much closer approach to uniformity is desirable.

Figure 3:
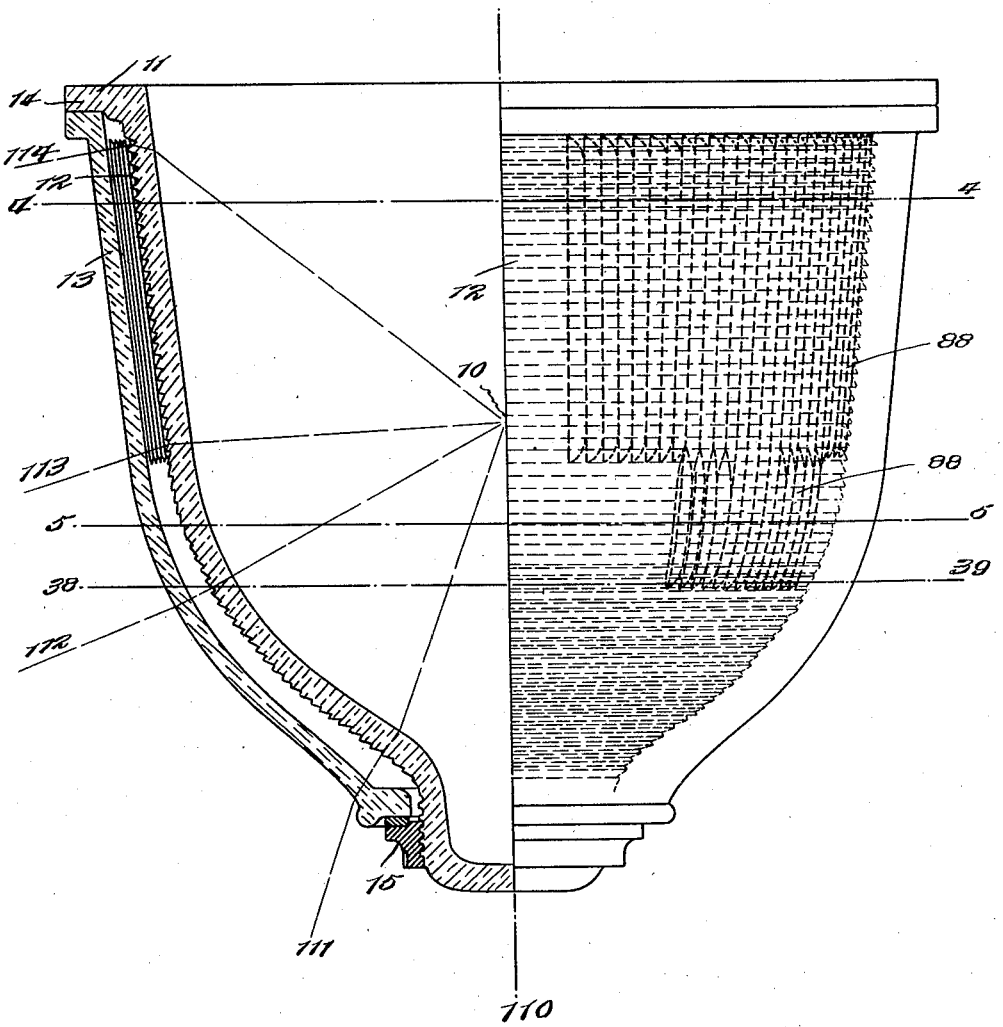
Fig. 3 is an elevation of a luminaire embodying the principles of my invention, bisected to show one-half in vertical cross-section.
Figure 4:
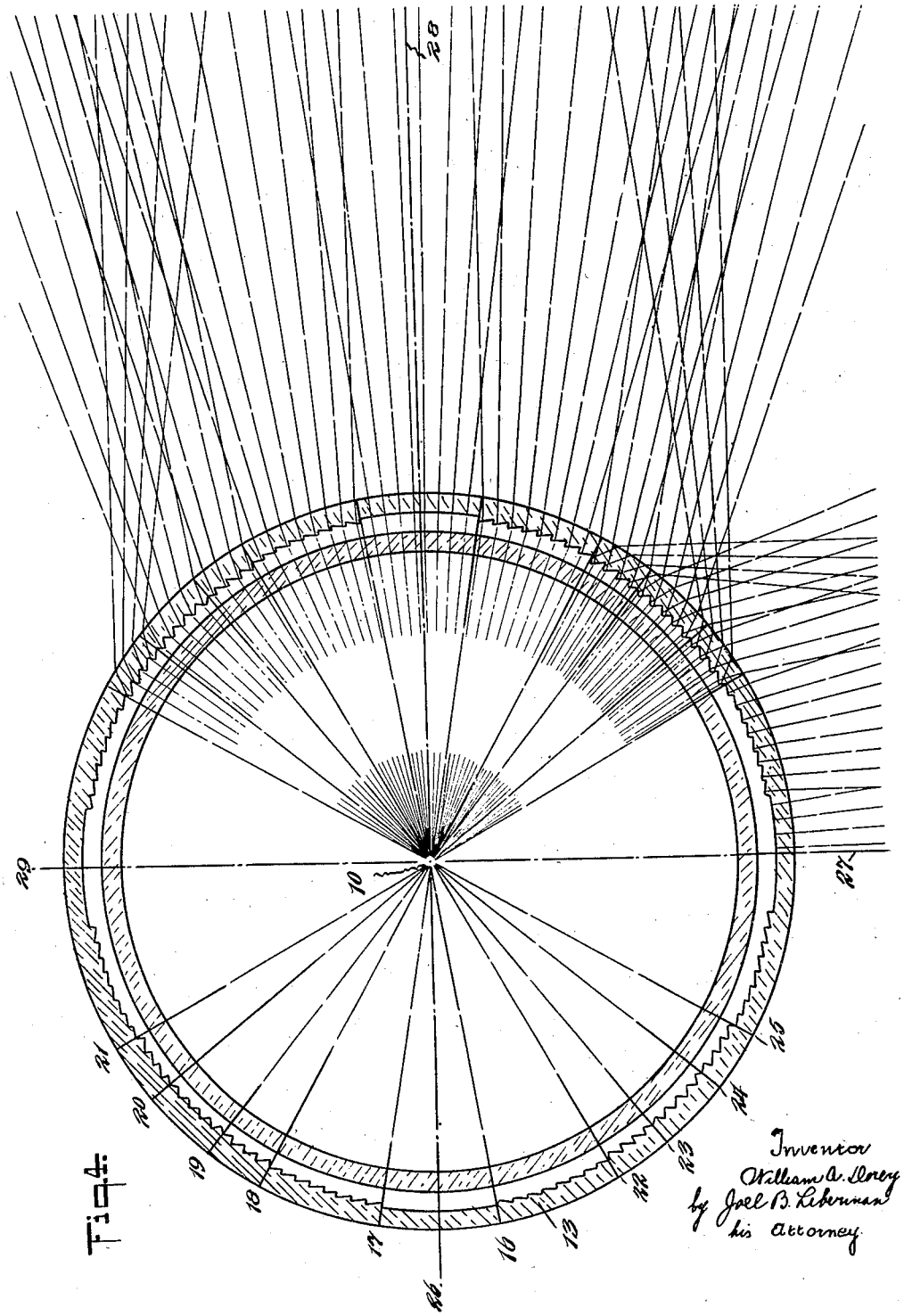
Fig. 4 is a horizontal cross section of the luminaire shown in Fig. 3 in the plane 4—4.
Figure 5:
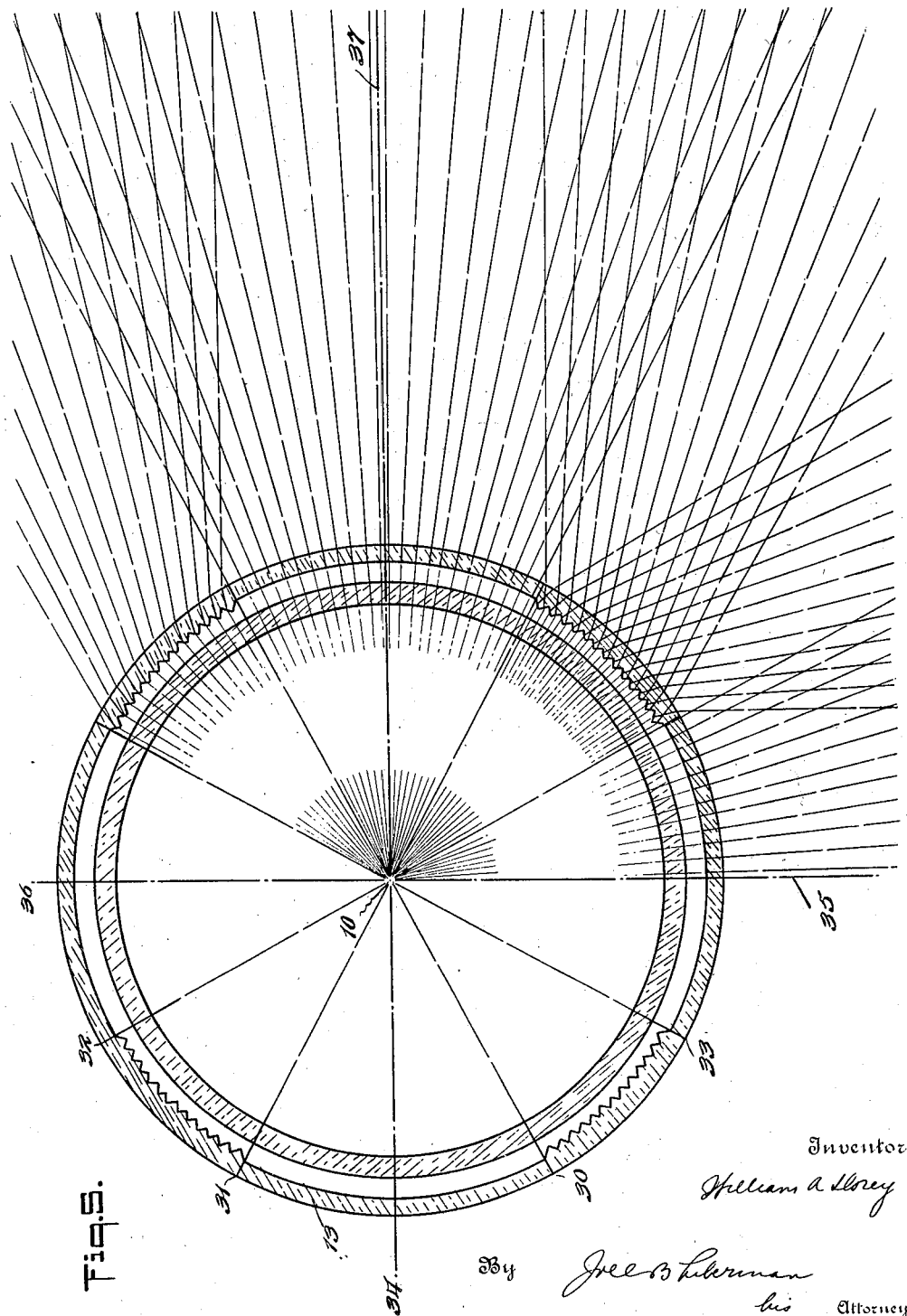
Fig. 5 is a similar horizontal cross section in plane 5—5 of Fig. 3.

Refractors for street lighting now on the market give a distribution of this sort, that is symmetrical with respect to the vertical axis and lights the whole area within the circle NP. In such cases the light which falls within such areas as AAQR is in large part wasted since illumination of a very low order in comparison with that of the street surface will usually be found quite satisfactory. All that light from the source which falls within the circle of radius N. S. is useful. It is apparent that at wider angles than MLS the useful light from the source lies within four symmetrical segments at right angles to each other and that the azimuthal or horizontal arcs of these useful segments decrease as the vertical angle increases until at vertical angle MLN, Fig. 1 only 132° or 37% of the full circle is useful. Fig. 3 shows elevation and Figs. 4 and 5 show diagrammatic cross sections on planes 4—4 and 5—5 respectively of Fig. 3 of one form of my invention which functions to use the light ordinarily wasted in such areas as RQAA, Fig. 2 to build up the intensities in the areas AAAA. In Fig. 3, 10 is the light source considered as a point. 11 is a refractor having horizontal prisms 12 over the entire outer surface and covered by outer envelope 13. The two glasses are ground together at the joint 14 and held by lock nut 15. A portion of the inner surface of envelope 13 is provided with vertical refracting prisms 88.

The course of typical light rays is shown in Figs. 3, 4 and 5 and the resultant distribution of the light is shown in Figs. 1 and 2.

The refractor is divided vertically into three portions having a different prismatic arrangement. The light rays striking the uppermost portion, Fig. 3 are transmitted by the inner refractor in a beam slightly divergent in vertical planes between the directional limits L'N' and L'T of Fig. 1. The light rays striking the middle portion, Fig. 3, are transmitted by the inner refractor in a beam slightly divergent in vertical plane between the directional limits L'T and L'U, Fig. 1. The light rays striking the lowermost portion are transmitted in widely divergent directions in vertical planes, between the limits L'U and L'M', Fig. 1.

In Fig. 4 the envelope 13 has four equally spaced plain segments of aperture 16—10—17 which permit the light from the inner refractor to pass through without lateral deviation to the area 1—1—2—2, Fig. 2. The light is distributed equally through any arc in this area.

The segment 17—18, Fig. 4 has an aperture 17—10—18, substantially equal to aperture 16—10—17. It is provided with vertical prisms of uniform angularity on the inner surface and of such angularity that the prism surfaces furthest from the plain segment 16—17 cause a lateral deviation of one-half the aperture 16—10—17. The light from this segment will therefore be emitted to the area 0, 0, 3, 3, Fig. 2. Since the prisms are of the same angularity with reference to the center 10 the light is distributed equally through any arc in this area.

Segment 18—19, Fig. 4 has an aperture 8—10—19 substantially equal to one-half the aperture 16—10—17. It is provided with vertical prisms on the interior of such an angularity that the surfaces furthest from the plain segment 16—17 cause a lateral deviation equal to the aperture 16—10—17. The light from this segment is emitted to area 2, 2, 3, 3 in Fig. 2 and is distributed equally through any arc in this area.

Segment 19—20, Fig. 4 has an aperture 19—10—20 substantially equal to one-half aperture 16—10—17. It is provided with vertical prisms on the interior of such angularity that the surfaces furthest from the plain segment 16—17 cause a lateral deviation 1½ times the aperture 16—10—17. The light from this segment is emitted to area 2, 2, 3, 3, Fig. 2 and is distributed equally through any arc in this area.

Segment 20—21, Fig. 4 has an aperture 20—10—21 substantially equal to one-half aperture 16—10—17. It is provided with vertical prisms on the interior of such angularity that the surfaces furthest from the plain segment 16—17 cause a lateral deviation of three times the aperture 16—10—17. The light from this segment is emitted to area 0, 0, 1, 1, Fig. 2 and is distributed equally through any arc in this area.

Segment 16—22, Fig. 4 is exactly similar in every respect to segment 17—18 except that the prism surfaces are in reverse position and therefore the light is emitted to area 0, 0, 7, 7, Fig. 2. In like manner segment 22—23, Fig. 4 is similar to segment 18—19 and emits light to area 1, 1, 7, 7, Fig. 2. Segment 23—24 Fig. 4 is similar to segment 19—20 and emits light to area 1, 1, 7, 7, and segment 24—25, Fig. 4 is similar to segment 20—21 and emits light to area 0, 0, 2, 2, in Fig. 2.

There results a wide beam covering the whole area 3, 3, 7, 7, Fig. 2 which is symmetrical with respect to axis M'N Fig. 2 and 10—26, Fig. 4. The arrangement of vertical prism surfaces with respect to axis 10—27, 10—28 and 10—29, Fig. 4 is entirely similar to the arrangement of prism surfaces with respect to axis 10—27. Therefore there results a wide beam symmetrical to each of the axes M'P', M'V and M'W, Fig. 2 entirely similar to the beam on axis M'N', which lights area 3, 3, 7, 7, Fig. 2.

It is evident in Fig. 4 that the prism surfaces in segments 18—19; 19—20; and 20—21 and 22—23; 23—24 and 24—25 which are towards the axis 10—26 are inoperative with respect to the beam on axis 10—26 but are calculated elements in producing the beams on axes 10—29 and 10—27 respectively. The surfaces in segments 17—18 and 16—22 which are towards the axis 10—26 are so nearly parallel to the adjacent light rays both before and after entering the envelope 13 that they may be considered as entirely inoperative.

For purposes of illustration in Fig. 4 the course of typical light rays is shown throughout the quadrant 27—10—28 and also through that part of the quadrant 29—10—28 which contributes to the beam on axis 10—28.

In Fig. 4 the spread beams from the various segments decrease in intensity as their distance from the combined beam axis increases on account of increases in surface reflection and increased interception of light by the prism surfaces toward the axis which are inoperative with respect to that axis. In order to balance the total intensities delivered to the inner half and the outer quarters of the total arc to be lighted, (Fig. 2), the inner half receives light from the plain segment, the first pair of prismatic segments and the extreme outer pair of prismatic segments and the outer quarters receive light from the first, second and third pairs of prismatic segments. The resultant beam in any arc through the whole area lighted is substantially uniform.

Fig. 5 shows horizontal cross section through 5—5 Fig. 3, segment 30—31, of outer envelope 13 having the aperture 30, 10, 31 is of smooth glass and transmits the light received from the inner refractor without lateral deviation to area 8, 8, 9, 9, Fig. 2. Segment 31—32, Fig. 5 has an aperture 31—10—32 substantially equal to one-half aperture 30—10—31. It is provided with vertical prisms on the interior of such angularity that the surfaces furthest from the plain segment 30—31 cause a lateral deviation equal to one-half the aperture 30—10—31. The light from this segment is emitted to area OU, 9, 9, Fig. 2 and is distributed equally through any arc in this area. Segment 30—33, Fig. 5 is entirely similar to segment 31—32 and the surfaces furthest from the plain segment 30—31 operate to emit to area 8, 8, 0, u, Fig. 2.

There results a wide beam covering area 8, 8, 9, 9 Fig. 2 which is symmetrical with reference to axis M'N Fig. 2 and 10—34, Fig. 5. The arrangement of vertical prism surfaces with respect to axes 10—35; 10—37 and 10—36 is entirely similar to the arrangement with respects to axis 10—34. Therefore there results a wide beam symmetrical to each of the axes M'P'; M'V and M'W, Fig. 2 entirely similar to beam on axis M'N which lights area 8, 8, 9, 9.

For purposes of illustration in Fig. 5, the course of typical light rays is shown throughout the quadrant 35—10—37 and also throughout that part of the quadrant 37—10—35 which contributes to the beam on axis 10—37.

In Fig. 3 that portion of the envelope below the horizontal plane 38—39 is plain on its inner surface. All of the light received from the inner refractor by this portion of the envelope 13 is transmitted without lateral deviation to the circular area of radius M'U, Fig. 2.

In Fig. 2 the boundaries of segmental areas such as 3, 3, 7, 7 and 8, 8, 9, 9 and the circular area of radius M'U practically coincide with the limits of the street area A. A. A. A and within these limits a substantially uniform illumination is obtained. Since the light source in practice is not a point, the light will not be cut off sharply at the edge of the segments. Moreover there will be sufficient stray reflected and refracted light from the unit to furnish a faint illumination within such areas as R. A. A. Q.

In the type shown in Fig. 3 the lower portion gives substantially equal intensities in all vertical planes. It is evident that this portion of the envelope 13 may be provided with symmetrical vertical flutes over its entire inner surface adapted to spread light laterally without distributing the combined lateral distribution from the unit.

Moreover in cases where it is desirable from an appearance standpoint to break up the plain surfaces in segments such as 16—17, Fig. 4, this may be accomplished by using a series of similar flutes without destroying the function of the device, providing that the flutes are small enough to give only slight deviation and allowance is made for this deviation in the whole design. In fact in some cases it will be found desirable to provide slight curvature for all of the prism surfaces.

The problem shown in Figs. 1 and 2 is only one of a number of cases in outdoor lighting where it is of advantage to produce spread beams of light through limited horizontal angles in order to light limited areas where the principal illumination is required.

Fig. 6 is a vertical cross section. Fig. 7 is a plan and Figs. 8, 9 and 10 are horizontal cross sections of a refractor unit for use in lighting highways. In this service the light sources are most conveniently mounted over the edge of the road and are preferably placed on very wide spacings. Moreover some provisions must be made for road curvature.

The refractor illustrated is designed specifically for a roadway 40 feet wide, light sources to be mounted 25 feet above the road and 400 feet apart. The sources are to be placed on the outer side of any curve in the road. As in the case illustrated in Fig. 1 the area to be lighted may be divided into ring sectors having the light source as a center and the angle of the sectors will decrease from a full circle near the unit to a comparatively small angle midway between light sources.

The case illustrated in Figs. 1 and 2 requires a four-way symmetrical arrangement of beams while in highway lighting a two-way beam is required. Moreover the axes of the various beams in the two general directions must lie to one side of the straight line between adjacent units so as to light the full width of roadway and supply extra spread to take care of road curvature with minimum waste.

Fig. 6 is a cross section in the vertical plane 82—93 of Fig. 7 parallel to the general direction of the road, and Fig. 6ᵃ is a similar cross section showing the refractor portion in greater detail. 10 is the light source considered as a point. 40 is a refractor having horizontal prisms 41 over the main portion of its outer surface and covered by outer envelope 42. A portion of the inner surface of envelope 42 is provided with vertical refracting prisms 43. The two glasses are ground together at the joint 44 and held by lock nut 45. Light from the source is emitted by portions 46—47 of refractor 40 in a beam slightly divergent in vertical planes between the directional limits 46—48 and 47—49. Light from the source is emitted by portion 47—50 of refractor 40 in a beam divergent in vertical planes between the directional limits 47—49 and 50—51. Light from the source is emitted by portion 52 of the refractor 40 in a beam divergent in vertical planes between the directional limits 50—51 and 52—53. Light from the source is emitted by portion 52—77 in widely divergent directions in vertical plane between the limits 52—53 and 10—54.

Fig. 8 is a cross section through horizontal plane 8—8 of Fig. 6 and is typical of that portion of the combined refractor lying between 46—48 and 47—49 of Fig. 6. Referring to Fig. 8 segment 55—56 of envelope 42 is plain on both surfaces and of aperture 55—10—56 permitting the light from inner refractor 40 to pass through without lateral deviation in a wide beam symmetrical to axis 10—67. Segment 55—57; 57—58 and 58—59 have apertures substantially equal to one-half aperture 55—10—56. Each of these segments is provided with vertical prisms of uniform angularity with reference to the center 10. The far surface on all these prisms cause a lateral deviation toward the axis 10—67. The deviation from segment 55—57 is equal to one-half aperture 55—10—56, the deviation from segment 57—58 is equal to the aperture 55—10—56. The deviation from segment 58—59 is one and one-half times aperture 55—10—56. Each of these segments will therefore transmit a wide beam substantially coincident in lateral direction with the half beam 55—10—67 from segment 55—56. Segment 59—60 has an aperture substantially equal to one-half aperture 55—10—56 and gives a deviation 1¾ times aperture 55—10—56. This segment will therefore transmit a wide beam across the outer edge of the main combined beam. Segment 56—61 is similar to segment 55—57 and segment 61—62 is similar to segment 57—58 except that the prism faces are oppositely placed and therefore the resultant spread beams are substantially coincident in lateral deviation with the half beam 67—10—56 from segment 55—56. Segment 62—63 is similar to segment 58—59 with the exception that the prism faces are oppositely placed and the aperture is one and one-half times as large, so that the resultant beam is substantially coincident at its inner edge with 10—67 but at its outer edge spreads beyond the lateral directional limit 10—56.

Segment 63—64 is provided with vertical prisms of such angularity that the resultant beam lies between the directional limit 10—56 and the outer directional limit of the beam from segment 62—63. Segments 60—65 and 64—66 are provided with prisms on the same angularity but oppositely placed. These give the greatest deviation possible from one set of prisms without too great loss of light on the near side of the prisms. The emitted light from these sections cover the outer edges of the main beam but spread beyond its limits.

The vertical prisms throughout envelope 42 are arranged symmetrically with reference to the axis 6—6 so a combined beam is produced about axis 10—70 entirely similar to the combined beam about axis 10—67.

Fig. 9 is a cross section through horizontal plane 6—6, Fig. 6 and is typical of that portion of the combined refractor lying between 47—49 and 50—51, Fig. 6.

Segment 71—72 is similar to segment 55—56 in Fig. 8 in that it is of smooth glass but is of greater aperture and the increase in aperture is most marked on the side toward points 72.

Segments 71—73, 73—74 and 74—76 Fig. 9 provide lateral deviations similar in degree and orientation to segments 55—57, 57—58 and 58—59, Fig. 8, respectively. In each case, however, the aperture of these segments is slightly greater in Fig. 9 than the apertures of the corresponding segments in Fig. 8.

Segment 72—79, Fig. 9 provides lateral deviation similar in degree and orientation to segment 61—62 Fig. 8 but is of much greater aperture.

Segment 79—81, Fig. 8 provides lateral deviation similar in degree and orientation to segment 64—66 in Fig. 8 and is slightly greater in aperture.

Segment 76—80, Fig. 9 provides lateral deviation similar in degree and orientation to segment 60—65, Fig. 8 and is of smaller aperture. There are no segments in Fig. 9 corresponding to segments 59—60, 56—61, 62—63 and 63—64 in Fig. 8.

The resultant combined beam from the portion of which Fig. 9 is representative will be most intense in lateral directions corresponding to the outer directional limits of the combined beam from the portion illustrated in Fig. 8, and if the portion illustrated by Fig. 9 were used alone there would be a considerable drop in intensity toward the center of the combined lateral beam. In practice, however, the light sources used are of appreciable length and light rays from the top of the source striking refractor 40 at and immediately above point 47, Fig. 6 will be refracted below the vertical directional limit 47—49, Fig. 6. Since the combined lateral beam in Fig. 8 is of a very high order of intensity the extreme lower rays from it passing below the directional limit 47—49 will be sufficient to reinforce the center of the beam from portion shown by Fig. 9. As a result the beam from the combined refractor between the vertical directional limits 47—49 and 50—51, Fig. 6 will be spread wider laterally than the combined beams between the vertical directional limits 46—48 and 47—49.

Fig. 10 is a cross section through horizontal plane 78—78, Fig. 6 and is typical of that portion of the combined refractor lying between 50—51 and 52—53 Fig. 6.

Segment 84—85, Fig. 10 is similar to segment 71—72 Fig. 9 in that it is of smooth glass but it is of greater aperture and the increase in aperture is most marked on the side toward point 85.

Segments 84—86, 86—87 and 87—89 provide lateral deviations similar in degree and orientation to segments 71—73, 73—74 and 74—76, Fig. 9, respectively but are slightly greater in aperture.

Segment 85—91, Fig. 10, provides lateral deviation similar in degree and orientation to segments 79—81, Fig. 9 and is of smaller aperture.

Segment 89—92, Fig. 10 provides lateral deviation similar in degree and orientation to segment 76—80 Fig. 9 and is of smaller aperture. There is no segment in Fig. 10 corresponding to segment 72—79, Fig. 9.

The resultant beam from the portion of the refractor of which Fig. 10 is representative will bear the same general relation to beam from portion, Fig. 9 that the beam from portion Fig. 9 bears to the beam from portion Fig. 8 in that it will be more widely extended laterally and be built up at the center by extreme downward light from the portion which Fig. 9 illustrates.

In Figs. 8, 9 and 10 the course of typical light rays is shown in quadrants 68—10—93 and 93—10—69. With vertical prisms of the character shown in which the inoperative surface of the prism is made substantially parallel to the course of light rays within the glass envelope 42, the inoperative surface will intercept a portion of the light at entrance and deflect it sharply away from the desired beam direction. This is an important factor in prisms giving useful deviations as great or greater than those from segments 57—58 and 61—62, Fig. 8. The course of typical light rays striking these inoperative prism surfaces are shown in Fig. 8, 10—94—95—96. These back refracted rays may be caught by perpendicular shields made of white porcelain enamelled steel or other material having a glossy white surface such as are shown at 97 and 98, Figs. 6, 7, 8, 9 and 10. These shields may be supported by a suitable housing of the same material shown at 90, Fig. 6 and this in turn may be supported by the lighting fixture which has not been shown in the drawing.

Now these perpendicular shades may be shaped in horizontal planes so as to receive a considerable portion of the outer fringe of the beams from such segments as 60—65 and 64—66 (Fig. 8) at a high angle of incidence so that there will be a large proportion of specular surface reflection in the direction of the main combined beam. By this means light which would otherwise be outside the useful arc may in part be redirected usefully. The course of typical rays specularly reflected by the shield is shown in Figs. 8, 9 and 10. Referring to Fig. 10 the upper light rays having lateral directions between 99—100 and 101—102 will strike the shield and be specularly reflected in lateral directions between 100—102 and 102—103 while the lower light rays having lateral directions between 99—100 and 101—102 will pass under the lower edge of the shield in lateral directions between 100—104 and 102—105.

Back refracted rays such as 95—96 series, Fig. 8 will strike the shields at small angles of incidence and in the main will be diffusely reflected. A portion of this diffused light will help to light the road near the unit and the shields will serve as a bright background cutting down the contrast between the brilliant refractor and surrounding darkness.

In Fig. 6 and Fig. 7 the lower portion 77 extends through the envelope 42. The inner surface of 53 is covered in part with concentric prisms 106 which redistribute light received by them in vertical radial planes helping to produce the required divergence between the vertical directional limits 52—53 and 10—54. The balance of the inner surface of 53 is provided with two sets of radial prisms 107 and 108 which refract the light upwardly and outwardly toward the road side of the unit as indicated by directional lines 109.

The complete unit as shown if properly installed will give a strong even illumination over a straight or moderately curved highway at a comparatively low cost due to the wide spacing of light sources. When sharp curves are encountered units may be spaced closer together and the light sources raised so that the vertical inclination of the beams is lowered.

The luminaire shown in Figs. 6 to 10 is designed to illuminate roads of considerable curvature. If it be used on long stretches of comparatively straight roadway there will be a considerable waste of light due to the fact that the spread of beam is unnecessarily broad at high vertical angles. This condition can be taken care of by a decrease in combined effective aperture in the uppermost portion of the outer envelope and consequent increase in beam intensity and decrease in spread at high vertical angles.

Fig. 11 shows a horizontal cross section of such a variation of the highway luminaire, taken at such a point as to be strictly comparable with Fig. 8. The special form illustrated in Fig. 11 is designed specifically for a straight roadway 40 ft. wide, light sources to be mounted 30 ft. above the road and 360 ft. apart. The combined beam required at high angles will then be approximately one-half as wide as that produced by the structure shown in Fig. 8.

In Fig. 11, 10 is the light source, 115 is an inner refractor and 116 an outer envelope. Segment 117—118 is plain on both surfaces and of aperture 117—10—118 permitting the light from inner refractor 115 to pass through without lateral deviation in a moderately wide beam symmetrical to axis 10—119.

Segments 117—119 and 118—120 have aperture substantially equal to aperture 117—10—118 and are provided with vertical prisms of uniform angularity with reference to center 10 but of opposite orientation giving deviations equal to the aperture. The resultant deviated beams from each of these segments will therefore be substantially coincident in width and direction with the beam emitted by segment 117—118. The construction and function of segments 119—121 and 120—122 is similar with the exception that the prisms are of such an angularity as to give a deviation equal to twice aperture 117—118. The resultant deviated beams will be substantially coincident with the beam from segment 117—118. In like manner the prisms in segments 121—123 and 122—124 are of such angularity as to produce deviation three times the aperture 117—10—118 and the resultant deviated beams will be substantially coincident with that from segment 117—118. In like manner the prisms in segments 123—125 and 124—126 are of such angularity that the deviation produced is four times the aperture 117—10—118 and the deviated beams are substantially coincident with the beam from segment 117—118.

Segment 125—127 receives light from the inner refractor 115 which has been given a slight prior deviation by the prisms 128 on the inner surface of the refractor 115. The prisms in segment 125—127 are of such an angularity that in combination with prisms 128 they give a combined lateral deviation equal to five times the aperture 117—10—118 and the deviated beam is substantially coincident with that from segment 117—118.

Segment 126—129 is entirely similar to segment 125—127 except that it is of opposite orientation.

Segment 127—130 receives light from the inner refractor 115 which has been given a prior deviation by prisms 131 on the inner surface of inner refractor 115. The prisms in this segment are of such angularity that in combination with prisms 131 they produce a total lateral deviation of six times aperture 117—10—118. The aperture of segment 127—130 is one and a half times the aperture 117—118 and therefore the inner limit of the deviated beam will coincide in direction with the line 10—118 but the outer limit of the deviated beam will extend beyond the direction of the limit 10—117.

Segment 129—132 is similar to segment 127—130 except that it is of opposite orientation and equal in aperture to 117—118 and therefore the deviated beam will be substantially coincident with that from segment 117—118.

Segment 130—135 is provided with prisms of similar angularity which emit light to the metal shade 134. This metal shade is so shaped as to cause this light to be reflected substantially parallel with the line 10—118. In like manner segment 132—135 emits light to the metal shade 136. This metal shade is so shaped as to reflect this light in the general direction 10—117.

The course of typical light rays from each of the segments is indicated. The section shown in Fig. 11 is comparable with the section shown in Fig. 8. A cross section of this luminaire for straight roads taken at a point corresponding to Fig. 9 would show a greater effective aperture than that shown in Fig. 11 and a section of the straight road luminaire corresponding to Fig. 10 would show a still wider aperture while the requirements of the prismatic construction in that portion of the luminaire corresponding to 77 in Fig. 6 would be substantially the same as in Fig. 6.

The arrangement of the segments of vertical prisms may be varied greatly to take care of variations due to size of light sources and to take care of various lighting requirements but under any circumstances in handling lighting of the general class illustrated in Figs. 1 and 2 there is a distinct advantage in using successive segments having prisms of the same angularity rather than single cylindrical divergent Fresnel lens forms because comparatively few tools of standard prism forms may be used in manufacturing the glass molds, because irregularities in the lateral distribution of the bare light source are neutralized due to the lapping of beams gathered from various lateral projections of the light source and because allowance may be more readily made for lateral and vertical distortion of deviation when the angle of incidence with reference to the prism edge is other than normal. The increase in lateral spread of beam at low angles is of distinct value because the lateral angle through which illumination is essential will increase as the unit is approached.

While I have shown and described luminaires adapted to be mounted or suspended at a considerable height it should be understood that the luminaires described and claimed can be adapted to any height and spacing.

While the present invention is peculiarly adapted to street lighting in which field the greatest experimentation has been made, the improvement is also useful in other illumination problems in which intensive illumination over a restricted area is required.

In various signal problems the same general form of intensity distribution is required as in the street lighting problems previously described. If the signal be placed above the level of the eye the lateral extent of the beam should increase as the vertical angle below horizontal increases. If the signal be placed below the level of the eye the lateral extent of the beam should increase as the vertical angle above the horizontal increases. In the case of a stop light on the rear of an automobile the beam at 2° above the horizontal should be of comparatively high intensity and have a lateral spread of about 20°. At 5° above the horizontal the beam may be of lesser intensity but should have a lateral spread of about 40°.

Fig. 12 shows in vertical cross section the application of my invention to a stop signal fulfilling the requirements stated. In Fig. 12, 140 is the light source considered as a point. 141 is a refractor having vertical prisms 142 over a portion of its interior surface and horizontal refracting prisms 143 on the rear half of its outer surface and horizontal reflecting surfaces 144 on the front half of the outer surface. The beam center lies in the vertical plane passing through the light source 140 and the dotted line 145. The vertical prisms 142 are arranged in segments similar to those previously described. Light from the source 140 striking the plain and prismatic segments between the lines 147 and 146 is condensed laterally to as great an extent as possible within a 20° arc and is condensed vertically at angles between the horizontal and 4° above horizontal on emerging through the horizontal prisms. Light from the source 140 striking the plain and prismatic segments between the lines 146 and 148 is condensed laterally within a 40° arc and is condensed vertically at angles between 4° and 15° above horizontal on emerging through the horizontal prisms. The smooth collar 149 at the bottom edge is provided with suitable lugs to permit locking the refractor into a housing or holder.

The application herein is a continuation in part of an application filed by me on June 12, 1923 as Serial Number 644.903.

I claim:

1. A luminaire comprising a light source and an envelope provided with an annular refracting surface opposite a surface provided with one or more segments of substantial aperture permitting the emission of wide intensive beams and segments consisting of longitudinal prisms adjacent thereto refracting incident light rays toward the first segments, the segments being so disposed as to increase the effective aperture toward one end of the envelope.

2. A luminaire comprising a light source and an envelope provided with an annular refracting surface opposite a surface provided with segments of substantial aperture permitting the emission of wide intensive beams and rows of longitudinal prisms arranged in tiers adjacent thereto refracting the incident light rays toward the segments, the segments and prisms in each tier being so disposed as to increase the effective apertures toward one end of the envelope.

3. A luminaire comprising a light source, an inner refracting envelope and an outer envelope provided with segments of substantial aperture permitting the emission of a wide intensive beam and prismatic segments adjacent to the first segments refracting incident light rays toward the first segments, the segments being so disposed as to increase the combined effective aperture, toward one end of the envelope.

4. A luminaire comprising a light source, an inner envelope provided with horizontal refracting prisms and an outer envelope provided with segments of substantial aperture permitting the emission of a wide intensive beam and prismatic segments adjacent to the first segments refracting incident light rays toward the first segments, the segments being so disposed as to increase the combined effective aperture, toward one end of the envelope.

5. A luminaire comprising a light source, an inner refracting envelope and an outer envelope provided with segments of substantial aperture permitting the emission of a wide intensive beam and segments adjacent to the first segments provided with vertical prisms refracting incident light rays toward the first segments, the segments being so disposed as to increase the combined effective aperture, toward one end of the envelope.

6. A luminaire comprising a light source, an inner refracting envelope and an outer envelope provided with plain segments of substantial aperture permitting the emission of a wide intensive beam and prismatic segments adjacent to the plain segments refracting incident light rays toward the plain segments, the segments being so disposed as to increase the combined effective aperture, toward one end of the envelope.

7. A luminaire comprising a light source, an inner refracting envelope and an outer envelope provided with segments arranged in tiers permitting the emission of a wide intensive beam and prismatic segments adjacent to the first segments refracting incident light rays toward the first segments to widen the combined effective aperture toward the base of the envelope.

8. A luminaire comprising a light source, an inner refracting envelope and an outer envelope enclosing the upper portion of the inner envelope, the outer envelope being provided with segments arranged in tiers permitting the emission of a wide intensive beam, and prismatic segments adjacent to the plain segments refracting incident light rays toward the plain segments to widen the combined effective aperture toward the exposed portion of the inner envelope.

9. A luminaire comprising a light source, an inner refracting envelope and an outer envelope provided with plain segments arranged in tiers increasing in aperture toward the bottom of the envelope, permitting the emission of a wide intensive beam, and prismatic segments adjacent to the plain segments refracting incident light rays toward the plain segments to widen the combined effective aperture toward the bottom of the envelope.

10. A luminaire comprising a light source, an inner refracting envelope and an outer envelope provided with segments of substantial aperture permitting the emission of a wide intensive beam and a plurality of segments adjacent to the first segments each provided with a series of prisms of the same angularity and refracting incident light rays toward the first segments, the segments being so disposed as to increase the combined effective aperture, toward one end of the envelope.

11. A luminaire comprising a light source, an inner annular refracting envelope and an outer refracting envelope provided with segments of substantial aperture permitting the emission of wide intensive beams and rows of longitudinal prisms arranged in tiers adjacent thereto refracting the incident light rays toward the segments the prisms in each tier being so disposed as to increase the effective apertures toward the base of the envelope.

12. A luminaire comprising a light source, and an envelope provided with an annular refracting surface opposite a surface provided with segments of substantial aperture permitting the emission of a wide intensive beam and a plurality of segments adjacent to the first segments, each provided with a series of prisms of the same angularity and refracting incident light rays toward the first segments to widen the combined effective aperture toward one end of the envelope.

Signed at Newark, in the county of Licking, and State of Ohio, this 29th day of October, 1923.

WILLIAM A. DOREY. [L. s.]